United States Patent
Garrett et al.

(10) Patent No.: US 10,050,797 B2
(45) Date of Patent: Aug. 14, 2018

(54) INSERTING SNAPSHOT CODE INTO AN APPLICATION

(71) Applicant: Microsoft Technology Licensing, LLC, Redmond, WA (US)

(72) Inventors: Charles D. Garrett, Woodinville, WA (US); Alexander G. Gounares, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 14/821,512

(22) Filed: Aug. 7, 2015

(65) Prior Publication Data
US 2015/0347275 A1 Dec. 3, 2015

Related U.S. Application Data

(63) Continuation of application No. 13/970,343, filed on Aug. 19, 2013, now abandoned.

(51) Int. Cl.
*G06F 9/44* (2018.01)
*H04L 9/32* (2006.01)
*G06F 11/36* (2006.01)

(52) U.S. Cl.
CPC ........ *H04L 9/3294* (2013.01); *G06F 11/3656* (2013.01); *G06F 11/3664* (2013.01)

(58) Field of Classification Search
None
See application file for complete search history.

(56) References Cited

U.S. PATENT DOCUMENTS

| | | |
|---|---|---|
| 6,016,474 A | 1/2000 | Kim et al. |
| 6,282,175 B1 | 8/2001 | Steele et al. |
| 6,553,564 B1 | 4/2003 | Alexander et al. |
| 6,721,941 B1 | 4/2004 | Morshed et al. |
| 6,742,179 B2 | 5/2004 | Megiddo et al. |
| 6,754,889 B1 | 6/2004 | Leverenz |

(Continued)

FOREIGN PATENT DOCUMENTS

| | | |
|---|---|---|
| CN | 101295279 | 10/2008 |
| EP | 2280348 | 2/2011 |

OTHER PUBLICATIONS

Khoo, et al., "Expositor: Scriptable Time-Travel Debugging with First-Class Traces," 2013 IEEE [retrieved on May 31, 2016] http://dl.acm.org/ft_gateway.cfm?id=2486835.

(Continued)

*Primary Examiner* — Wei Zhen
*Assistant Examiner* — Binh Luu
(74) *Attorney, Agent, or Firm* — Workman Nydegger

(57) ABSTRACT

A debugging system may display snapshot information that may be collected in response to an event identified while an application executes. The debugging system may allow a user to browse the various data elements in the snapshot, and may allow the user to modify a snapshot configuration by including or excluding various data elements within the snapshot data. The user interface may have a mechanism for including or excluding data elements that may be presented during browsing, as well as options to change the events that may trigger a snapshot. The updated snapshot configuration may be saved for future execution when the event conditions are satisfied.

19 Claims, 10 Drawing Sheets

(56) References Cited

U.S. PATENT DOCUMENTS

| | | | |
|---|---|---|---|
| 6,795,962 B1 | 9/2004 | Hanson | |
| 6,836,881 B2 | 12/2004 | Beynon et al. | |
| 6,961,924 B2 | 11/2005 | Bates et al. | |
| 7,058,928 B2 | 6/2006 | Wygodny et al. | |
| 7,076,767 B1 | 7/2006 | Williams | |
| 7,240,335 B2 | 7/2007 | Angel et al. | |
| 7,318,218 B2 | 1/2008 | Aguilar, Jr. et al. | |
| 7,343,588 B2 | 3/2008 | Bates et al. | |
| 7,383,538 B2 | 6/2008 | Bates et al. | |
| 7,401,322 B1 | 7/2008 | Shagam et al. | |
| 7,448,025 B2 | 11/2008 | Kalafatis et al. | |
| 7,464,373 B1 | 12/2008 | Yunt et al. | |
| 7,490,319 B2 | 2/2009 | Blackwell et al. | |
| 7,536,680 B2 | 5/2009 | Berry et al. | |
| 7,584,456 B1 | 9/2009 | Veenstra et al. | |
| 7,627,728 B1 | 12/2009 | Roeck et al. | |
| 7,681,181 B2 | 3/2010 | Canning et al. | |
| 7,743,279 B2 | 6/2010 | Walker et al. | |
| 7,765,597 B2 | 7/2010 | Sima et al. | |
| 7,788,644 B2 | 8/2010 | Koduru et al. | |
| 7,797,685 B2 | 9/2010 | Agarwala et al. | |
| 7,827,539 B1 | 11/2010 | Wygodny et al. | |
| 7,895,409 B2 | 2/2011 | Mendonca | |
| 7,930,684 B2 | 4/2011 | Roeck et al. | |
| 8,001,529 B2 | 6/2011 | Babut et al. | |
| 8,032,868 B2 | 10/2011 | Bates et al. | |
| 8,037,454 B2 | 10/2011 | Bates et al. | |
| 8,074,207 B1 | 12/2011 | Reilly | |
| 8,166,462 B2 | 4/2012 | Kosche et al. | |
| 8,286,036 B2 | 10/2012 | Mahajan et al. | |
| 8,312,435 B2 | 11/2012 | Wygodny et al. | |
| 8,370,110 B2* | 2/2013 | Gupta | H04L 41/5009 702/182 |
| 8,381,041 B2 | 2/2013 | Walker et al. | |
| 8,402,318 B2 | 3/2013 | Nieh et al. | |
| 8,543,991 B2 | 9/2013 | Ramaswamy et al. | |
| 8,566,795 B2 | 10/2013 | DeWitt et al. | |
| 8,732,722 B2 | 5/2014 | Swildens | |
| 8,776,026 B2 | 7/2014 | Candea et al. | |
| 8,818,760 B2 | 8/2014 | Shannon et al. | |
| 8,819,641 B1 | 8/2014 | Sweeney | |
| 8,839,201 B2 | 9/2014 | Schissel et al. | |
| 8,881,115 B2 | 11/2014 | Bates et al. | |
| 8,930,914 B2 | 1/2015 | Cohen et al. | |
| 8,935,673 B1 | 1/2015 | Ashkenazi et al. | |
| 8,949,791 B2 | 2/2015 | Lu et al. | |
| 9,021,444 B2* | 4/2015 | Garrett | G06F 11/1448 717/124 |
| 9,465,721 B2* | 10/2016 | Garrett | G06F 11/366 |
| 2002/0087950 A1 | 7/2002 | Brodeur et al. | |
| 2002/0174416 A1 | 11/2002 | Bates et al. | |
| 2003/0088854 A1 | 5/2003 | Wygodny et al. | |
| 2005/0102673 A1 | 5/2005 | DeWitt et al. | |
| 2005/0149809 A1 | 7/2005 | Draeger et al. | |
| 2005/0273757 A1 | 12/2005 | Anderson | |
| 2006/0136582 A1 | 6/2006 | Mills | |
| 2007/0005915 A1 | 1/2007 | Thompson et al. | |
| 2007/0006018 A1 | 1/2007 | Thompson et al. | |
| 2007/0039049 A1 | 2/2007 | Kupferman et al. | |
| 2007/0250820 A1 | 10/2007 | Edwards et al. | |
| 2008/0127061 A1* | 5/2008 | Kasman | G06F 8/35 717/106 |
| 2008/0282087 A1 | 11/2008 | Stollon et al. | |
| 2010/0138811 A1 | 6/2010 | Jayaraman et al. | |
| 2010/0211932 A1* | 8/2010 | Jones | G06F 11/3624 717/124 |
| 2010/0262954 A1 | 10/2010 | Roos | |
| 2011/0047359 A1* | 2/2011 | Eichenberger | G06F 8/451 717/145 |
| 2011/0078656 A1* | 3/2011 | Tsuta | G06F 8/20 717/110 |
| 2011/0145800 A1 | 6/2011 | Rao et al. | |
| 2011/0283266 A1 | 11/2011 | Gallagher et al. | |
| 2012/0102488 A1 | 4/2012 | Wintergerst et al. | |
| 2012/0180057 A1 | 7/2012 | Levine et al. | |
| 2012/0278793 A1 | 11/2012 | Jalan et al. | |
| 2013/0036403 A1 | 2/2013 | Geist | |
| 2013/0227586 A1 | 8/2013 | Levine et al. | |
| 2014/0019756 A1 | 1/2014 | Krajec | |
| 2014/0019985 A1 | 1/2014 | Krajec | |
| 2014/0201720 A1 | 7/2014 | Tessier et al. | |
| 2014/0310679 A1 | 10/2014 | Bhattacharya et al. | |
| 2015/0052400 A1 | 2/2015 | Garrett et al. | |
| 2015/0052403 A1 | 2/2015 | Garrett et al. | |
| 2015/0052406 A1 | 2/2015 | Garrett et al. | |
| 2016/0188440 A1* | 6/2016 | Bates | G06F 11/3624 717/129 |

OTHER PUBLICATIONS

Jorwekar, et al., "Automating the Detection of Snapshot Isolation Anomalies," 2007 ACM; [retrieved on May 31, 2016] http://dl.acm.org/ft_gateway.cfm?id=1325995.

Nasr, "A Proposed Paradigm for Tracing the Effect of Security Threats in Various Mobile Agent Systems," 2015 IEEE [retrieved on May 31, 2016] http://ieeexplore.ieee.org/stamp.jsp?tp=&arnumber=7176428.

Wang, et al., "Profiling Program and User Behaviors for Anomaly Intrusion Detection Based on Non-Negative Matrix Factorization," 2004 IEEE [retrieved on May 31, 2016] http://ieeexplore.ieee.org/stamp/stamp.jsp?tp=&arnumber=1428613.

U.S. Appl. No. 13/970,302, filed Jun. 9, 2016, Notice of Allowance.

Wisniewski, et al., "Efficient, Unified, and Scalable Performance Monitoring for Multiprocessor Operating Systems", In Proceedings of the ACM/IEEE Conference on Supercomputing, Nov. 15, 2003, 14 Pages.

Phang, et al., "Expositor: Scriptable Time-Travel Debugging with First-Class Traces", In Proceedings of the 35th International Conference on Software Engineering (ICSE), May 18, 2013, pp. 352-361.

Hummer, et al., "A Step-By-Step Debugging Technique to Facilitate Mashup Development and Maintenance", In Proceedings of the 3rd and 4th International Workshop on Web APIs and Services Mashups, Dec. 1, 2010, 8 pages.

Polishchuk, et al., "Dynamic Heap Type Inference for Program Understanding and Debugging", In Proceedings of the 34th Annual ACM SIGPLAN-SIGACT Symposium on Principles of Programming Languages, Jan. 17, 2007, pp. 39-46.

"International Search Report Issued in PCT Application No. PCT/US2014/011932", dated May 20, 2014, 3 Pages.

Cazzulani, Stefano, "Do more with Chrome Developer Tools", The Chromium Blog, Published on: Oct. 23, 2012. Avaialble at «http://blog.chromium.org/2012/10/do-more-with-chrome-developer-tools.html».

"Diagnosing memory problems in your webpages", Published on: Jun. 26, 2013. Available at «http://msdn.microsoft.com/en-us/library/ie/dn255003(v=vs.85).aspx».

Eargle, Chris, "Using the JustTrace Timeline", Telerik Blogs. Published on: Feb. 28, 2013. Available at «http://blogs.telerik.com/chriseargle/posts/13-02-28/using-the-justtrace-timeline».

U.S. Appl. No. 13/970,319, Sep. 18, 2014, Office Action.
U.S. Appl. No. 13/970,319, Mar. 2, 2015, Notice of Allowance.
U.S. Appl. No. 13/970,302, Oct. 1, 2014, Office Action.
U.S. Appl. No. 13/970,302, Mar. 5, 2015, Office Action.
U.S. Appl. No. 13/970,302, Oct. 15, 2015, Office Action.
U.S. Appl. No. 13/970,343, Oct. 22, 2014, Office Action.
U.S. Appl. No. 13/970,343, Feb. 25, 2015, Office Action.

Kwangyong Lee et al: "A Development of remote tracepoint debugger for un-time monitoring and debugging of timing constraints on Qplus-p RTOS", Software Technologies for Future Embedded Systems, 2003. IEEE Workshop on May 15-16, 2003, Piscataway, NJ, USA, IEEE, May 15, 2003 (May 15, 2003), pp. 93-96, XP010640297.

Extended European Search Report issued in European Patent Application No. 14837230.3 dated May 24, 2017.

\* cited by examiner

INSERTING SNAPSHOT CODE INTO AN APPLICATION

BACKGROUND

Crash dumps are datasets that may be collected when a computer program encounters an error for which the computer can no longer function. Operating systems and other software management products may collect data at a catastrophic failure so that a programmer may be able to detect the cause of the failure. The programmer may then be able to recreate the error or make changes that may prevent the error from occurring again.

SUMMARY

A tracing and debugging system may take a snapshot of an application in response to an event, and may continue executing the program after the snapshot is captured. The snapshot may be stored and retrieved later in a debugging tool where a programmer may browse the snapshot or the snapshot may have some other analysis performed. The snapshot may contain a subset of the state of the application, such as call stacks, portions of source code, the values of local and global variables, and various metadata. The snapshot may be defined in a snapshot configuration that may include an event description and data to be collected.

A tracing and debugging system may collect both performance related tracer data and snapshot data. The tracer data may contain aggregated performance and operational data, while the snapshot data may contain call stack, source code, and other information that may be useful for debugging and detailed understanding of an application. The snapshot data may be stored in a separate database from the tracer data, as the snapshot data may contain data that may be private or sensitive, while the tracer data may be aggregated information that may be less sensitive. A debugging user interface may be used to access, display, and browse the stored snapshot data.

A debugging system may display snapshot information that may be collected in response to an event identified while an application executes. The debugging system may allow a user to browse the various data elements in the snapshot, and may allow the user to modify a snapshot configuration by including or excluding various data elements within the snapshot data. The user interface may have a mechanism for including or excluding data elements that may be presented during browsing, as well as options to change the events that may trigger a snapshot. The updated snapshot configuration may be saved for future execution when the event conditions are satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
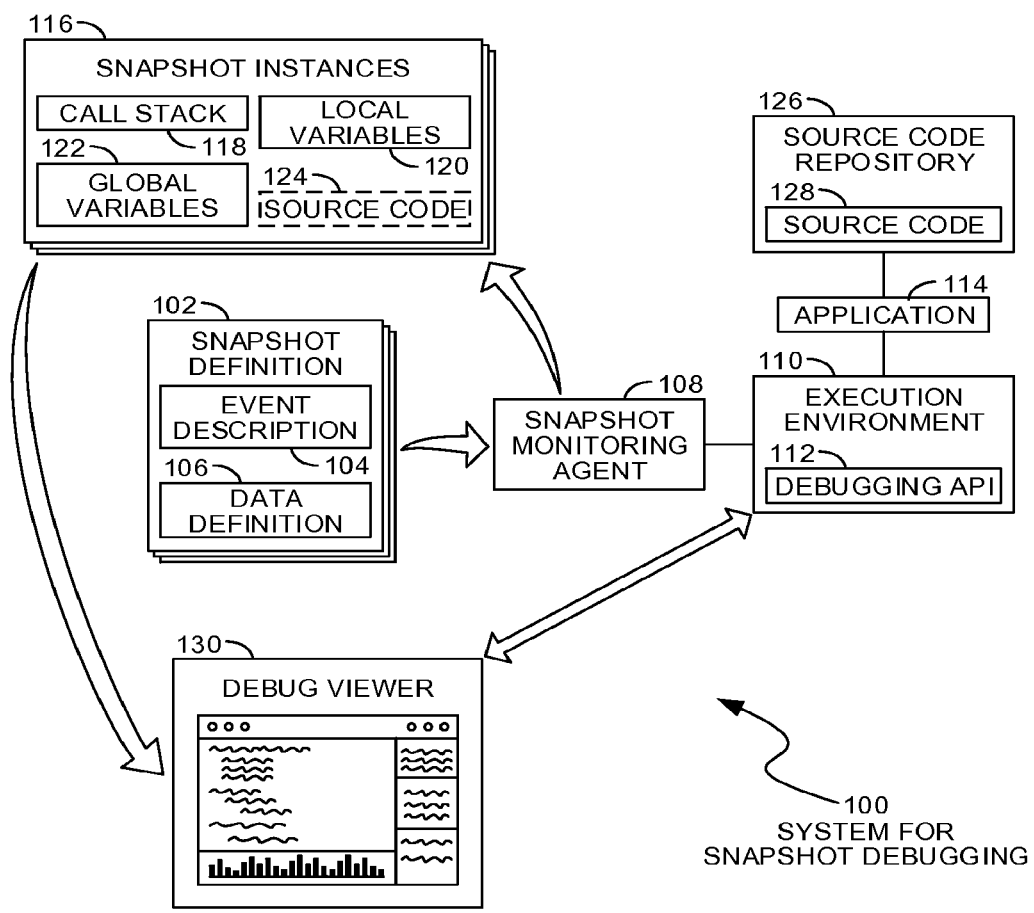
FIG. 1 is a diagram illustration of an embodiment showing a system for snapshot debugging.

Snapshotting Executing Code with a Modifiable Snapshot Definition

A snapshot debugging system may take snapshots of an application in response to an event, and store the snapshots for later viewing. The snapshots may occur as an application executes, and may collect various program state at the designated events. The program state may include local and global variable values, call stacks, source code related to the executing code, and other information.

A debugging interface may be used to view, browse, or otherwise inspect the contents of each snapshot. In some cases, the snapshots may be relatively lightweight glimpses of the program as each event is detected. A programmer may define snapshots for conditions where problems may have occurred in the past, and the snapshots may allow the programmer the ability to look back to the program state at the time of the event to determine the causes and effects of the monitored event.

The snapshot mechanism may be deployed in several manners. In a simple implementation, a programmer may manually insert snapshot code into an application. The snapshot code may include conditions that, when satisfied, cause a snapshot to be taken.

In a more complex implementation, the snapshot code may be deployed by monitoring the application code at runtime. In such an implementation, a monitoring agent may check for the snapshot conditions. When the conditions are satisfied, the monitoring agent may cause the application to pause, then collect the snapshot data, and cause the application to resume execution. Such an implementation may be deployed in conjunction with a monitoring system that may wrap function calls or provide some other performance monitoring.

The snapshots may be edited and modified. The snapshot may include a definition of the event that may trigger a snapshot to be taken, as well as a definition of the data to be collected. The triggering event definition may be defined using any type of expression, event, or other information, and may be evaluated at runtime. The data collection definition may define the type of data to collect, as well as values from local and global variables, metadata, external events, or other information. In some embodiments, the snapshots may include executable code that may be executed as part of the data collection process.

The snapshots may be viewed using a viewing or browsing user interface. In many cases, the snapshots may be viewed in a debugging user interface, which may also serve as part of a real time debugger. Such embodiments may view the stored snapshots as instances of the real time debugger that are recalled from the point the snapshots were taken. The user interaction with the snapshots may be similar to the user interaction with a real time debugger, but may lack the ability to step forward or backwards through the code like a real time debugger.

The snapshot debugging system may be a lightweight data collection system that may gather program state at various events. The data collection may be lightweight in the sense that an application may be paused for a short period of time, then continue execution. Such data collection may give a programmer some insight into what occurs around specific events, so that the programmer may be better able to improve or modify the application.

Combined Performance Tracer and Snapshot Debugging System

A tracing and snapshot debugging may integrate continuous performance measurements and snapshots to better understand a computer application's behavior. The performance measurement system may monitor an application on a periodic basis, and may be a platform on which snapshots of the program state may be taken.

The performance measurement system may monitor an application by different mechanisms, such as instrumenting the application, monitoring an execution environment in which an application runs, or other mechanisms. While the monitoring is ongoing, a snapshot manager may detect conditions for snapshots and may cause a snapshot to be taken and stored.

The performance measurements may be aggregations of performance metrics, such as counters or other summary metrics, while the snapshots may contain actual data that may be handled or processed by an application. In such embodiments, the snapshots may contain sensitive data and the snapshots may be stored in a separate storage repository than performance metrics, which may contain less sensitive information. In some embodiments, some or all of the snapshot data may be encrypted.

Breakpoint Setting Through a Debugger User Interface

A debugging user interface may be used for viewing and browsing snapshot instances. When viewing a snapshot instance, the debugging user interface may have a similar user experience as when the same interface may be used for real time debugging, however the data being displayed may be retrieved from a storage repository for the snapshots as opposed to retrieving data from a live execution environment in the case of real time debugging.

A user may be able to create or modify a snapshot definition for deploying future snapshots. In many cases, a snapshot may contain a subset of an application's state at the time a snapshot is taken. When a user identifies a variable or other data object that is not contained in a snapshot, the user may be able to add the object to future snapshots. In a typical user interface, the user may be able to drag and drop, right click, or perform some other interaction in the user interface to select the object for inclusion or exclusion from the snapshot.

After a snapshot is defined, the snapshot may be deployed to collect data while an application executes.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an example embodiment 100 showing a system for snapshot debugging. Embodiment 100 is an example of various components that may interact to collect snapshot data when conditions for the snapshot are met, then store the snapshots to be viewed by a debug viewer. The snapshots may capture application state in response to some condition or event being detected.

The snapshot system may collect application state, such as call stack information and values for selected variables. The snapshot may capture a glimpse of the application at a specific event or condition, and may help a programmer understand an application's behavior.

The snapshot system may collect snapshots that may be viewed and browsed later. Such a system may be used to collect data over time. In one use case, a programmer may have a bug or other anomaly that may be difficult to reproduce. The programmer may create one or several snapshots that may be taken under conditions similar to the anomaly. The programmer may launch the snapshots and let the application run, so that the snapshots collect program state when the anomaly occurs. The programmer may come back after a period of time and view the snapshot datasets to help understand the application's state at the time of the anomaly.

The user interface for viewing, browsing, and exploring the snapshots may be similar to a debugging user interface. In a debugging user interface, an application's source code may be displayed along with local and global variable values. The programmer may explore a snapshot using the same user interface as the programmer would use to explore a running application in debugging mode.

A snapshot definition 102 may contain an event description 104 and a data definition 106. The event description 104 may be a condition under which the snapshot may be taken, and the data definition 106 may define the data to be collected.

The event description 104 may include any type of expression for defining an event. The expression may use an internal value, such as when local variable X=1. The expression may use external information, such as a specific time of day or when a hardware interrupt may be raised. In some cases, the expression may include complex expressions that may be evaluated at runtime to determine whether or not to take a snapshot.

Throughout this specification and claims, the term "take a snapshot" is used to denote a process of collecting state information in response to an event. The state information may be collected while an application is paused. In some embodiments, snapshot data collection code may be inserted into an application, which may effectively pause the application while the snapshot data collection code executes and collects various application state. In other embodiments, the processing of an application may be paused within and operating system or other execution environment, and a separate process may collect the application state during the pause.

The data definition 106 may define the data to collect. Some embodiments may have a default data collection setting that may be varied by including or excluding elements from the default setting. In many cases, the data definition may include a call stack, which may include application code currently being executed, plus each call frame of higher level functions back to an outer loop or main level of an application.

A call stack may be a data structure that stores information about active subroutines of an application. The call stack may be known as an execution stack, control stack, run-time stack, machine stack, or other nomenclature. In many cases, the call stack may define a point to which a subroutine may return when it has finished execution. Some call stacks may store data for local variables at each call frame of the stack, as well as parameters that may be passed to and from subroutines.

The data definition 106 may include complex memory objects that may be defined in a hierarchical structure. In some embodiments, such memory objects may be collected by unpacking the structure at different levels. For example, a default setting may unpack and collect complex memory objects at a first level, such that the first level values of the data structure may be captured and saved in the snapshot definition. Some data definition settings may cause such complex memory objects to be collected in their entirety, or at various levels within the data structure's hierarchy. In some cases, a specific sub-object, value, or set of values may be defined for collection.

The data definition 106 may include various metadata relating to the snapshot. Such metadata may include external information about the computer system on which the application is executing, such as the processor type and speed, memory and storage capacities and availabilities, hardware and software configurations, and other information. Such metadata may also include timestamps, performance information, or other metadata.

The snapshot definitions 102 may be consumed by a snapshot monitoring agent 108, which may cause snapshot data to be collected when the event described in an event description 104 may occur. The snapshot monitoring agent 108 may be deployed in several different forms.

In a simple deployment, a programmer may manually insert snapshot code into an application. In such a deployment, the snapshot code may be executable code that may collect data and transmit the data to a snapshot repository. The executable code may be include a call to a debugging application programming interface 112 to collect call stack information, metadata, variable values, and other information. The executable code may also include a call to a collection application programming interface which may receive the data, perform some processing and packaging of the data, and cause the snapshot instance to be stored.

In a more complex deployment, snapshot code may be inserted into an application automatically. In some such deployments, the snapshot code may be inserted prior to runtime by automatically traversing the application code to identify conditions for which a snapshot may be taken. Such insertion may occur prior to runtime by analyzing source code or intermediate code, determining an appropriate location, and adding snapshot code that may evaluate the event description and, when the event conditions are satisfied, cause a snapshot to be taken.

Some embodiments may insert snapshot code into an application at runtime. In one runtime insertion system, a monitoring system may wrap various functions for performance monitoring. The monitoring system may be detect that a condition for a snapshot may be present, and may cause the snapshot code to be inserted.

In another runtime insertion system, a monitoring agent may monitor a running application, detect that the event conditions are satisfied, and cause the application to pause. Some such systems may deploy the monitoring agent as a separate thread or process than the application which is being monitored. Some such systems may use monitoring mechanisms that may be part of an operating system or execution environment to monitor the application as it executes.

The execution environment 110 may execute an application 114 from which snapshots may be taken. The execution environment 110 may be an operating system, process virtual machine, system virtual machine, or other construct that may manage the execution of the application 114.

The application 114 may be any type of computer program. The application 114 may be written in any computer language, from high level languages with complex frameworks to binary executable code. In some cases, the application may be compiled prior to execution, while in other cases, the application may be interpreted at runtime.

Snapshot instances 116 may be generated at each event. The snapshot instances 116 may include call stack 118, local variables 120, global or shared variables 122, and source code 124 as well as other data and metadata. In systems where the source code may be readily available by a debugging application programming interface 112, such as when the application 114 is interpreted, the snapshot monitoring agent 108 may be able to collect source code for each call frame.

A snapshot instance 116 may include pointers to locations in source code in some embodiments. Such pointers may reference source code 128 which may be stored in a source code repository 126. When the source code may be displayed while viewing a snapshot instance, the source code may be retrieved from the source code repository 126

A debug viewer 130 may display snapshot instances. The debug viewer 130 may be a full-fledged debugging system that may be able to execute code in a user interface and have functions for pausing execution, examining variables, setting breakpoints, stepping through executable code, and other functions. Such systems may also include editors, compilers, and other components.

When displaying a snapshot instance, the debug viewer 130 may present the snapshot information using the same user interface as the debugging system but may retrieve the underlying data from a stored snapshot rather from an execution environment in which the application may be executing.

The debug viewer 130 may be any type of interface through which a snapshot instance may be viewed. In many cases, the user interface may present a subset of the snapshot instance 116 and a user may explore or browse different portions of the user interface to uncover and view various data.

The debug viewer 130 may have capabilities to create and edit snapshot definitions. A user may be able to identify conditions or breakpoints for snapshot collection, as well as include or exclude various data elements for collection. The updated or newly created snapshots may be deployed for execution when the application 114 is executed in the future.

Figure 2:
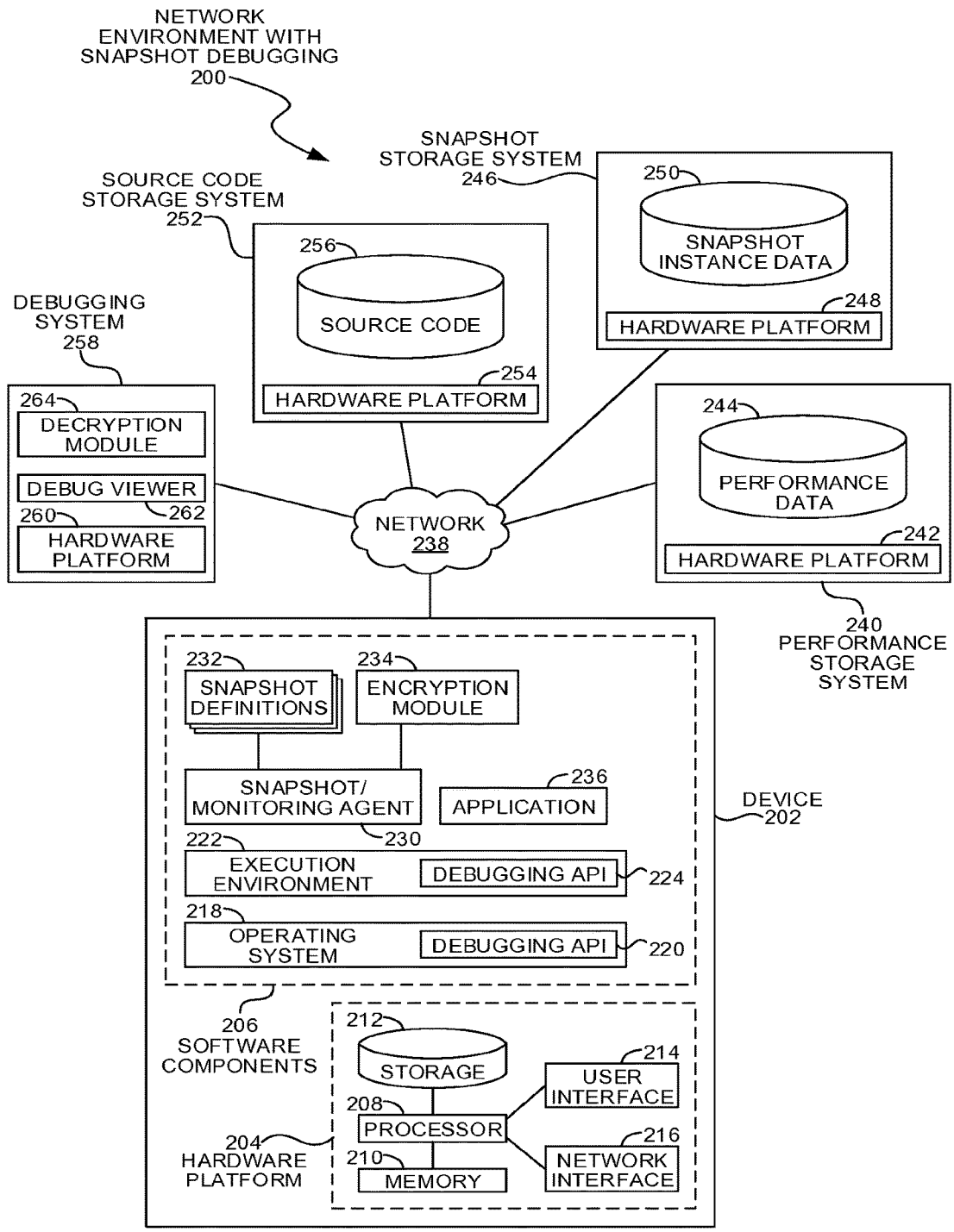
FIG. 2 is a diagram illustration of an embodiment showing a network environment with devices that may collect and view snapshots.

FIG. 2 is a diagram of an embodiment 200 showing components that may collect and view snapshot instances when an application is executed. The example of embodiment 200 is merely one example of a multi-device system that may generate and view snapshot instanced. Other architectures may include single device and multiple device architectures.

The architecture of embodiment 200 includes a device 202 on which the snapshots may be collected, as well as several other devices for storing different elements of the snapshot. A last device may view the snapshot instances. In other embodiments, some or all of the functions illustrated may be combined into one or more devices.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. Depending on the embodiment, the application 236 may be executed in an operating system 218 or in an execution environment 222. The operating system 218 and execution environments 222 may have debugging application programming interfaces 220 and 224, respectively.

A set of snapshot definitions 232 may define conditions for taking snapshots. A snapshot and monitoring agent 230 may perform dual roles of monitoring and managing snapshot collection. During execution of the application 236, the snapshot and monitoring agent 230 may detect that a condition for a snapshot has been satisfied, then collect various data elements as defined in the snapshot definition 232.

The snapshots may be taken by calling debugging application programming interfaces 220 or 224. The debugging application programming interfaces may respond to requests to collect various program state, such as the call stack, local and global variables, and other information. In some cases, the executing source code may also be retrieved in this manner.

The snapshots may be encrypted prior to being stored. An encryption module 234 may encrypt some or all of the snapshot prior to transmitting the snapshot over a network 238 to a snapshot storage system 246.

Some snapshots may contain sensitive or other information that may have an obligation for control and security. For example, an application that may process credit card numbers, personally identifiable information, or other sensitive information may have such information gathered in a snapshot. To prevent such data from being viewed or accessed, the snapshot may be encrypted at the point of creation. The snapshot may be decrypted by an authorized user when using a debug viewer.

The encryption module 234 may use any type of encryption or obfuscation mechanism to protect the contents of a snapshot instance. In some cases, a public/private key system may be used, while in other cases some type of substitution cypher, dictionary, or other mechanism may be used to remove or obfuscate any sensitive information.

Some embodiments may selectively apply encryption or obfuscation mechanisms. For example, a snapshot instance may encrypt of obfuscate all data values for variables but may leave other data in the snapshot instance in plain text. A snapshot definition may include indicators for selectively encrypting or obfuscating different data elements within the snapshot instance.

The network 238 may connect various devices together. The network 238 may be a local area network, wide area network, or any other communications network.

A performance storage system 240 may collect and store performance data collected during execution of the application 236. The performance storage system 240 may include a hardware platform 242, which may be similar to the hardware platform 204. A performance database 244 may store the various performance information datasets collected by the snapshot and monitoring agent 230.

A snapshot storage system 246 may collect and store snapshot instance data. The snapshot storage system 246 may have a hardware platform 248, which may be similar to the hardware platform 204. A snapshot instance database 250 may store the individual snapshot instances.

In some embodiments, different security policies may be applied to the performance data and snapshot data collected from an application. In many cases, the performance data may be aggregated data that may include function names but may not include underlying data handled by the application. In contrast, the snapshot data may include sensitive data that may have a more restrictive security policy applied.

The security policies may be applied by having different storage systems for performance and snapshot data, where the snapshot data may be stored and managed with a more restrictive security policy. A restrictive security policy may dictate physical security, encryption settings, network configuration, access restrictions, or other configurations in order to limit access and protect data from unauthorized access.

A source code storage system 252 may store and retrieve application source code. The source code storage system 252 may have a hardware platform 254, which may be similar to the hardware platform 204. Some such systems may include version management systems that may save different versions of source code. When a version management system is available, a snapshot may be created with a link or descriptor to the specific version of the application that may be executing. Such systems may retrieve the specified version of the application source code when displaying the snapshot instance in a debugging viewer.

A debugging system 258 may be a system on which a programmer may view the snapshot instances among other functions. The debugging system 258 may operate on a hardware platform 260, which may be similar to the hardware platform 204.

A debug viewer 262 may be an application that may display snapshot instances. In many cases, the debug viewer 262 may be an interactive application that may allow a programmer to interact with the snapshot instances in a similar manner as a debugger. The debug viewer 262 may be a standalone application, may be an interactive page rendered in a browser, or may have some other architecture.

The debugging system 258 may have a decryption module 264, which may decrypt the data encrypted by the encryption module 234 when the snapshot instance was created.

Figure 3:
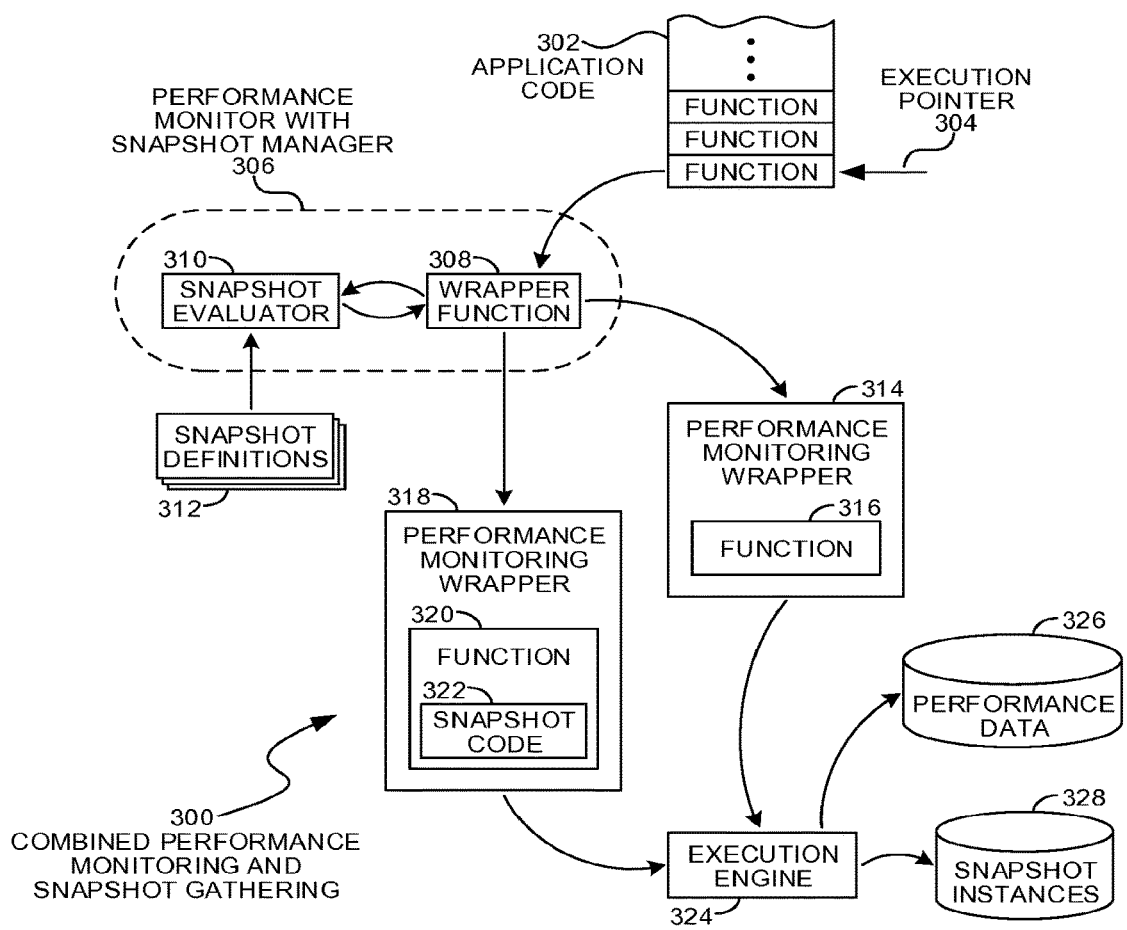
FIG. 3 is a diagram illustration of an embodiment showing a combined performance monitoring and snapshot gathering system.

FIG. 3 is a diagram illustration of an embodiment 300 showing a combined performance monitoring and snapshot gathering system. Embodiment 300 illustrates functional components of a system that may apply performance or monitoring wrappers to functions, and may also insert snapshot code at runtime.

Embodiment 300 may illustrate one example of a system that may wrap various functions for performance monitoring or tracing. The wrappers may gather and store performance information for each wrapped function, and the performance information may be stored for analysis or potentially displayed in real time.

The wrapping function may be one mechanism whereby the conditions for a snapshot may be evaluated with each function call. When the conditions may be present, the wrapping system may insert snapshot code into the wrapped function or into the wrapper to cause a snapshot to be taken.

In some cases, a determination may be made at wrapping time that some of the conditions for a snapshot may be present, but that other conditions may be unknown. In such a case, the snapshot code may include code that may evaluate the additional conditions which, when met, may cause the snapshot to be evaluated. In some cases, the snapshot code may be inserted into a function and one or more additional conditions may not be met, causing the snapshot to not be taken.

The structure of the executable code representing a snapshot may include a set of conditions and a mechanism for gathering and storing snapshot data. Such an embodiment may be inserted into an application such that the application halts other processing and executes the snapshot code.

The conditions may be expressed as executable code that contains a full set or subset of conditions, and the executable code may be evaluated at the point of taking a snapshot. When all of the conditions are met, the snapshot executable code that gathers snapshot information may then be executed.

Such a mechanism may be deployed in both dynamic and static languages. Dynamic languages may be a loose classification of programming languages that refer to those computer languages that may have mechanisms for modifying the application after compile time. Such actions may include adding new code, extending objects and definitions, modifying the type system, and other changes. Static languages may be able to perform such operations in some cases, but may typically not contain explicit features for doing so. Examples of dynamic programming languages are ActionScript, Clojure, Common Lisp, JavaScript, Perl, PHP, Python, R, Ruby, Smalltalk, and others.

A system may receive application code 302. The application code 302 may contain several functions, with a current function identified by an execution pointer 304. As each function is identified for execution, a performance monitor with snapshot manager 306 may process the function.

The incoming function may be wrapped using a wrapper function 308. The wrapper function 308 may contain monitoring mechanisms that collect performance and operational data, which may be used to monitor or display performance or operational characteristics of the application.

When a function may be considered for wrapping, a snapshot evaluator 310 may scan through one or more snapshot definitions 312 to determine whether or not a condition for a snapshot may be met by the function or within the function.

When a snapshot has the potential to be executed within a function or as part of a wrapper, the snapshot evaluator 310 may insert snapshot code into the function or wrapper. The snapshot code may include additional conditions that may be evaluated during execution.

When no snapshot code is to be inserted, a function 316 may be created with a performance monitoring wrapper 314. The wrapped function may be executed by an execution engine 324, and the wrapper may output performance data 326 for analysis.

When a snapshot may be taken as part of the function, a wrapper may be created around the function 320, and snapshot code 322 may be inserted into the function 320. In some cases, the snapshot code 322 may be part of the wrapper 318 and may be executed before or after the function 320.

The wrapped function 320 may be executed by the execution engine 324, with the wrapper 318 generating performance data 326 and the snapshot code 322 generating snapshot instances 328.

Embodiment 300 is merely one mechanism for deploying snapshots that may be useful with dynamic languages. Other embodiments may have different logic or may deploy snapshots in different manners using dynamic or static programming languages.

Figure 4:
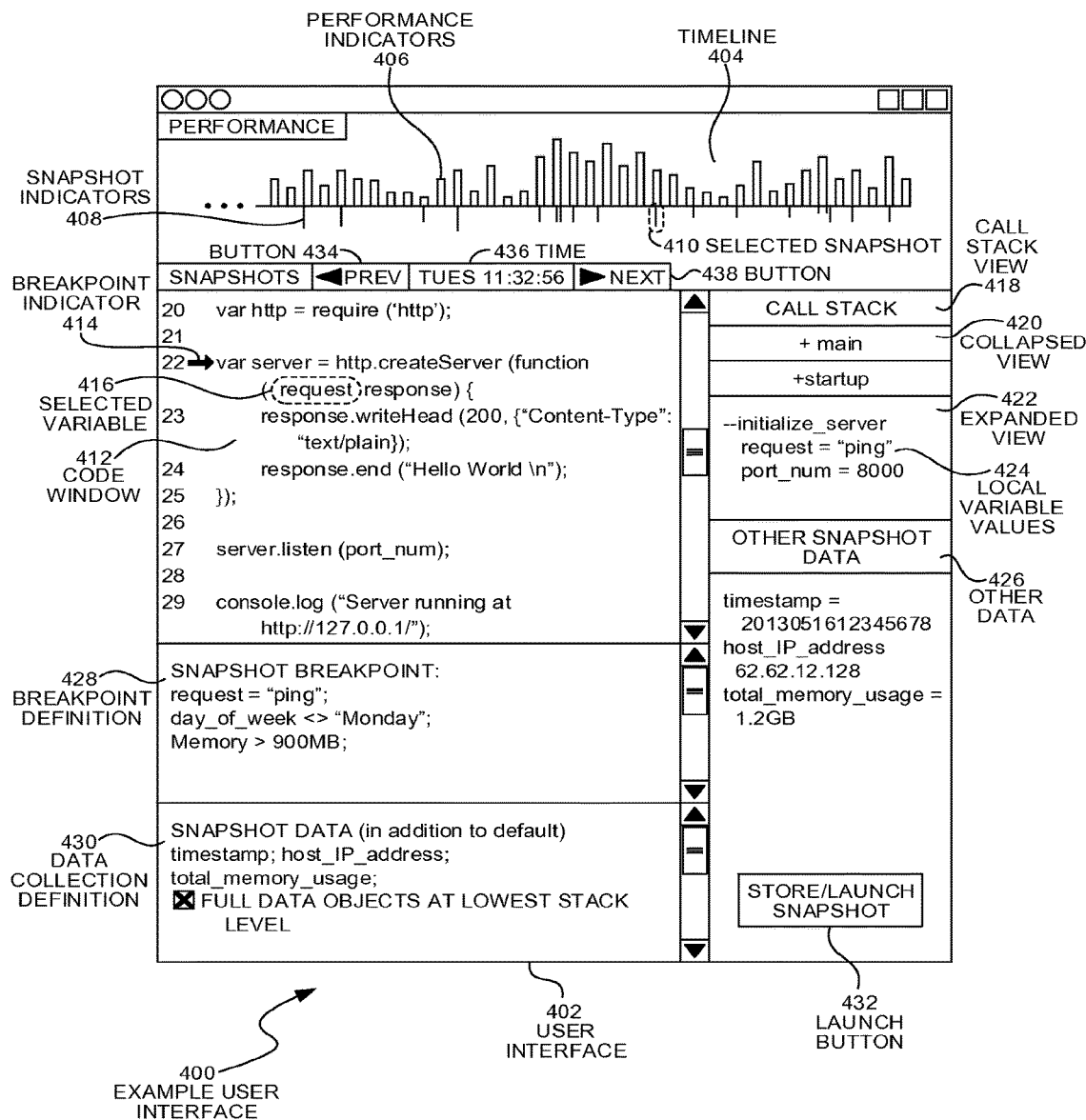
FIG. 4 is a diagram illustration of an embodiment showing an example user interface for a debug viewer.

FIG. 4 is an example illustration of an embodiment 400 showing a user interface 402 that may display snapshot information to a user. The user may be able to browse the contents of a snapshot, as well as create or modify a snapshot. The user interface 402 is merely one example of such a user interface.

The user interface 402 may allow a programmer to browse source code and the state of an application at the point a snapshot was taken. The programmer may be able to view the call stack, the source code at each level of the call stack, and values of variables. The programmer may be able to modify existing snapshots or create new snapshots for later execution.

A timeline 404 may present both performance data and snapshot instances. The top portion of the timeline may contain various performance indicators 406, while the bottom portion of the timeline may include snapshot indicators 408. Each of the snapshot indicators 408 may represent a single snapshot.

The timeline 404 may be an interactive mechanism for viewing performance information that may have been collected over a period of time, along with the presence of snapshots that may have been taken during the same time period. When the timeline 404 is an interactive interface, a user may be able to select various elements of the timeline to view underlying data. For example, a user may click on one of the performance indicators 406 to view performance data collected during the representative time period.

A selected snapshot 410 may cause the user interface 402 to be populated as illustrated. The selected snapshot 410 may represent a specific snapshot that a user wishes to view, and the selection may cause the snapshot to be retrieved from storage and displayed in the user interface 402.

A code window 412 may display the source code of the application at the point of a snapshot. The source code may initially be displayed at the location that the snapshot was taken, and the user may be able to traverse up the call stack to view source code at locations where the various functions in the call stack were called.

In some embodiments, the source code may be contained in the snapshot definition, while in other embodiments, a snapshot may contain pointers or other links to the source code. Snapshots that store source code may be useful in systems where the source code may be changing rapidly, such as in development environments. In such systems, the entire source code of an application may not be available for browsing, as the snapshot may only contain source code in the vicinity of the functions in the call stack.

A breakpoint indicator 414 may signify the location in the source code where a snapshot was taken. The code in the code window 412 may be the code in the vicinity of the breakpoint, and the user may be able to scroll up or down in the code window 412 to view more.

The variables in the code window 412 may be interactive elements. In the example of embodiment 400, a selected variable 416 may be highlighted. A user may select such a variable by clicking, right clicking, or perform some other action to indicate and select the variable. While the variable is selected, the user may be able to view the current value of the variable, as well as use the variable to define a breakpoint, add or remove the breakpoint from data collection, and other uses.

In some cases, the selected variable 416 may be highlighted by the user interface when the value for the selected variable is known.

A call stack view 418 may serve as both a tool to view variable values as well as a code navigation tool. The call stack view 418 may show each function called as a subroutine to a top level function. When the call stack view is interactive, a user may be able to select and expand a particular frame in the call stack.

An expansion of a call stack frame may present the local variables for the expanded level of the call stack. In the example of embodiment 400, the frame "main" is shown in a collapsed view, while the frame "initialize_server" is shown in an expanded view 422. In the expanded view 422, local variables 424 are shown.

The call stack view 418 may be used to navigate the source code. In some embodiments, the selection of a specific call stack frame may cause the code window 412 to be updated with the source code in the vicinity of the subroutine call represented by the call stack frame.

Other data 426 may be displayed as part of a snapshot view. The other data 426 may be metadata, external data, or other information that may be collected along with the snapshot.

A breakpoint definition 428 may define the conditions under which the snapshot was collected. In the example of embodiment 400, the snapshot was taken when the incoming data object was "ping", the day of the week was not Monday, and the value of memory was greater or equal to 900 MB. The breakpoint definition 428 may be an interactive window where a programmer may be able to add, remove, or modify the conditions for the snapshot.

Similarly, the data collection definition 430 may define the data to be collected. In many cases, a snapshot system may have a default set of data that may be collected. In such cases, the data collection definition 430 may define changes to the default settings by adding or removing values to be collected. In many cases, the data collection definition 430 may include metadata or other information that may be outside the normal scope of a snapshot.

If the breakpoint definition 428 or data collection definition 430 are updated, the programmer may launch the snapshot for future data collection by using the launch button 432. By launching the snapshot, future execution of the application may be done with the new snapshot definition.

A set of navigation buttons may be used to navigate through the various snapshots. A previous button 434 and next button 438 may be actuated to select the previous and next snapshots, respectively. When selected, the snapshot may be displayed in the user interface 402. An identifier 436 may display the date and time of the current snapshot for the user's reference.

Figure 5:
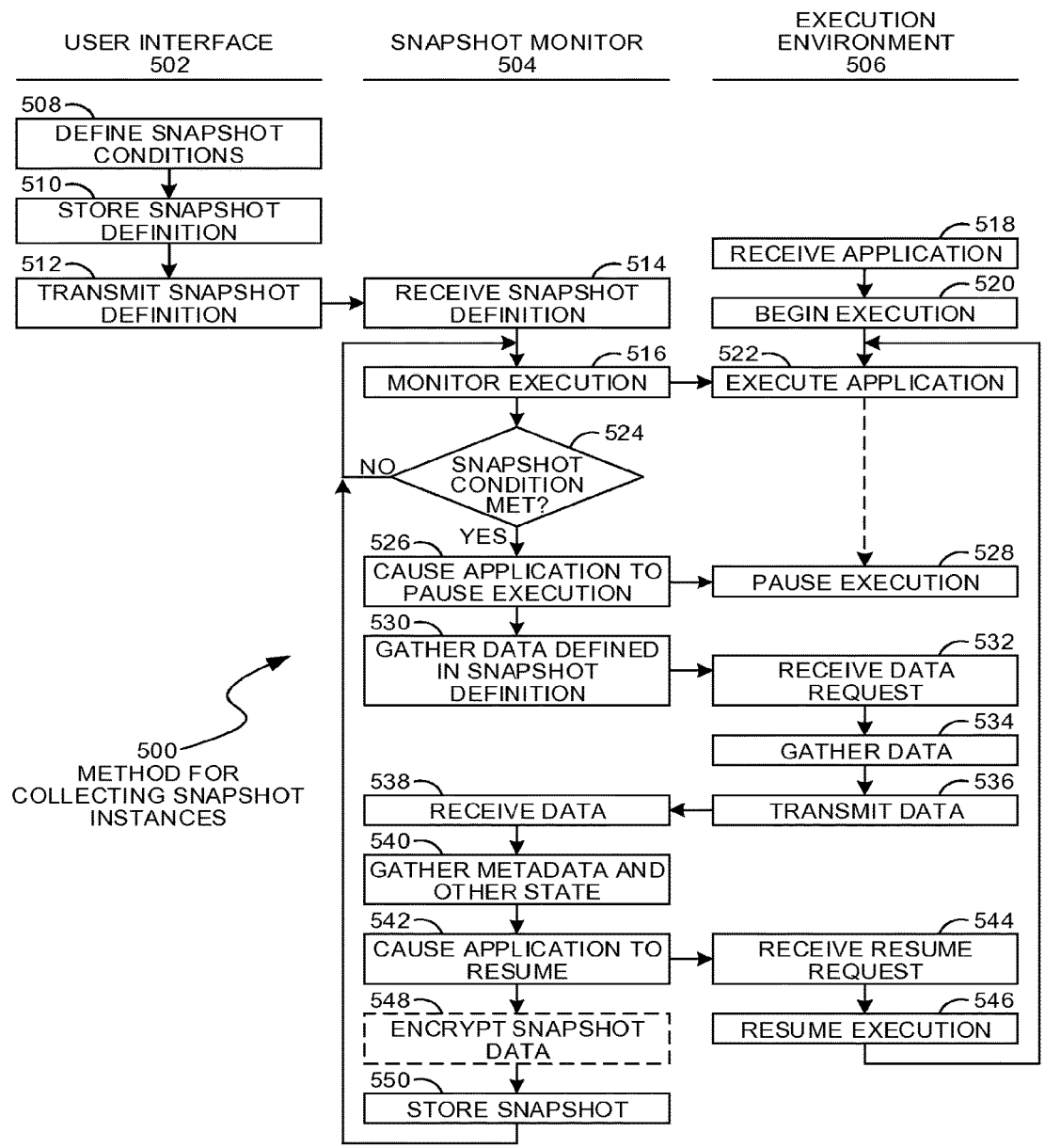
FIG. 5 is a flowchart illustration of an embodiment showing a method for collecting snapshot instances.

FIG. 5 is a flowchart illustration of an embodiment 500 showing a method for collecting snapshot instances. The operations within a user interface 502 are illustrated in the left hand column, operations within a snapshot monitor 504 are illustrated in the center column, and operations within an execution environment 506 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a general method that shows snapshot deployment and data collection. A user may create snapshot definitions using a user interface 502, then the snapshot definitions may be deployed to a snapshot monitor 504. The snapshot monitor 504 may cause the snapshots to be deployed and collect snapshot instances by working in conjunction with an execution environment 506.

The method of embodiment 500 is a general method that may be deployed using several different types of mechanisms. In one mechanism, a programmer may manually insert snapshot code in an application. In other mechanisms, the snapshot code may be inserted in an application before or during execution. In still other mechanisms, a snapshot monitor 504 may be a separate process that may interact with an execution environment 506 but may not change the application code.

In a user interface 502, snapshot conditions may be defined in block 508 and stored in block 510. The snapshot conditions may include both conditions for executing the snapshot and the data to be collected. The snapshot definition may be transmitted in block 512 to the snapshot monitor 504, which may receive the snapshot definition in block 514.

The execution environment 506 may receive an application in block 518 and begin execution in block 520. While the application executes in block 522, the snapshot monitor 504 may monitor the execution in block 516.

During the monitoring, the snapshot monitor 504 may check to determine whether or not the conditions for the snapshot have been met in block 524. When the conditions have not been met, the process may return to block 516.

When the conditions for a snapshot have been met in block 524, the snapshot monitor 504 may cause the application to pause execution in block 526, which may be transmitted to the execution environment 506 where the execution may be paused in block 528.

The snapshot monitor 504 may gather data defined in the snapshot definition in block 530. Part of the data gathering may include transmitting a request to the execution environment 506, which may be received in block 532. The execution environment 506 may gather the requested data in block 534 and transmit the data to the snapshot monitor 504 in block 538.

Many execution environments may have a debugging application programming interface or other mechanisms by which various data may be collected. A typical debugging application programming interface may be able to retrieve a call stack as well as local, global, and other variables.

The data may be received by the snapshot monitor 504 in block 538. Additional state and metadata may be collected in block 540 while the application may be paused, after which the snapshot monitor 504 may cause the application to resume in block 542. The execution environment 506 may receive the resume request in block 544 and resume execution in block 546. The process of the execution environment may return to block 522 to continue execution.

The snapshot monitor 504 may optionally encrypt the snapshot data in block 548 before storing the snapshot instance in block 550. In some embodiments, certain portions or subsets of the snapshot data may be encrypted.

Figure 6:
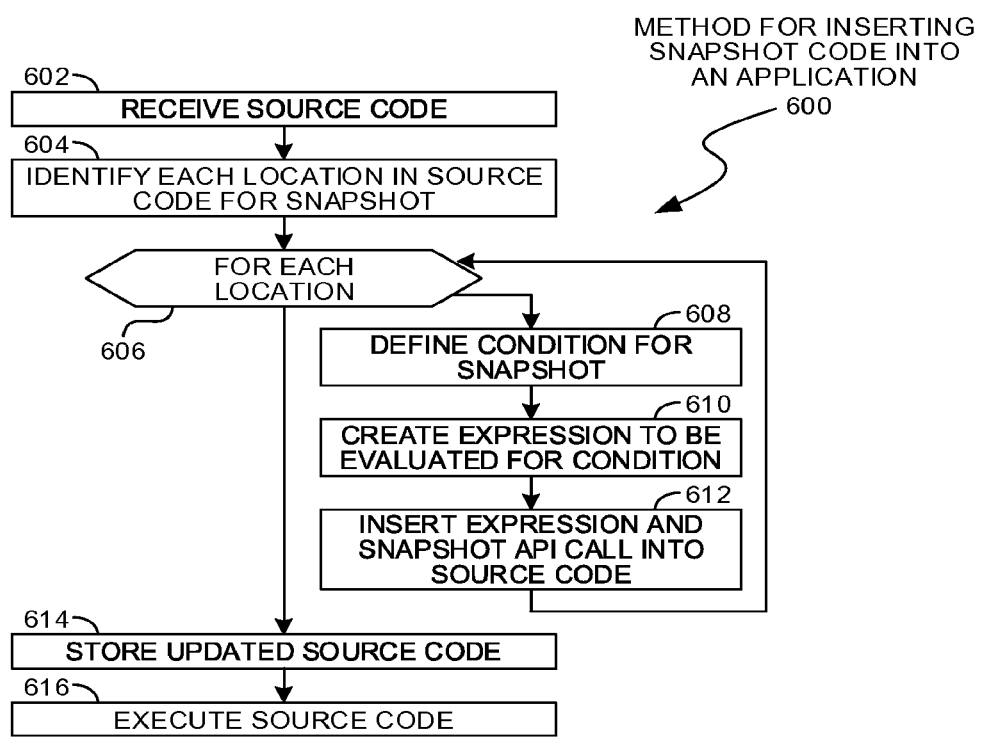
FIG. 6 is a flowchart illustration of an embodiment showing a method for inserting snapshot code in an application.

FIG. 6 is a flowchart illustration of an embodiment 600 showing a simplified method for inserting snapshot code into an application. The method of embodiment 600 may be a manual or automated method that may modify an application's code by inserting snapshot code in locations where a snapshot may be taken.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Snapshot code may consist of a set of conditions for collecting a snapshot along with code for collecting and storing snapshot data as snapshot instances. When the snapshot code is executed, the application in effect stops execution until the snapshot code has completed, then the application may resume processing.

The source code may be received in block 602. Each location within the source code for a snapshot may be identified in block 604.

Each of the locations may be processed in block 606. For each location, a condition for the snapshot may be defined in block 608. An expression defining the condition may be created in block 610. The expression may be executable code in the same language as the application.

In some embodiments, the snapshot code may be defined in a high level programming language that may have been used for the application. In other embodiments, the snapshot code may be defined using intermediate code, machine language, or in a different language than the main application.

The snapshot code may be inserted into the application in block 612. In some embodiments, a snapshot may call various application programming interfaces that may gather, process, and store snapshot instances.

After processing each of the locations and inserting snapshot code in each location in block 606, the updated source code may be stored in block 614 and executed in block 616.

Embodiment 600 may be implemented in a manual method by a programmer. In such a case, the programmer may manually identify the locations for snapshots and insert code for each snapshot.

In other cases, the method may be implemented in an automated fashion. Some embodiments may process source code for an application to automatically scan for locations in the source code for snapshots, then automatically insert snapshot code. Such automated systems may insert snapshot code in source code, which may be subsequently compiled or interpreted. In some cases, the automated systems may insert snapshot code in intermediate code form, which may be subsequently compiled in a just in time compiler prior to execution, or may be interpreted in intermediate form.

The method of embodiment 600 places snapshot code at predefined locations within the application. Such an embodiment may infer that one of the conditions for a snapshot may be execution of the application to the location of the snapshot code.

Figure 7:
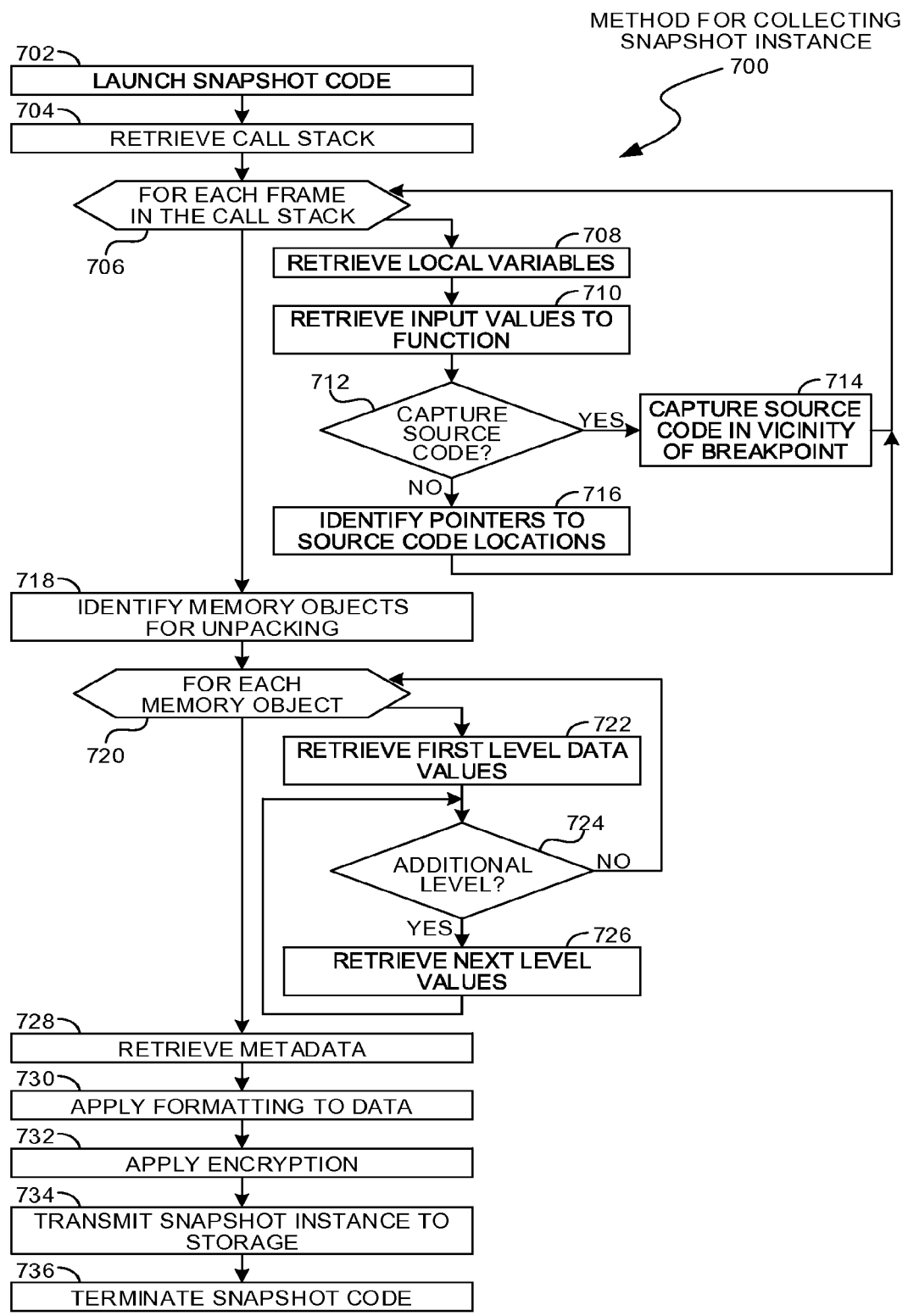
FIG. 7 is a flowchart illustration of an embodiment showing a more detailed method for collecting snapshot instances.

FIG. 7 is a flowchart illustration of an embodiment 700 showing a more detailed method for collecting snapshot instances. Embodiment 700 illustrates one example of the data that may be collected in a snapshot, along with an example method for how these data may be collected.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 may illustrate the data collection performed by for a snapshot instance. In some cases, the operations of embodiment 700 may be embodied in executable code that may be inserted in an application.

Snapshot code may be launched in block 702.

The call stack may be retrieved in block 704. The call stack may have multiple frames, each of which may define a calling function that calls a subroutine. Many computer languages may have a notion of a call stack, although some languages may use different nomenclature and some programming environments may have more or fewer data elements stored in the call frames.

Each frame of the call stack may be processed in block 706. For each frame, local variables for the frame may be retrieved in block 708. Values of parameters passed to the called function may be retrieved in block 710.

In some embodiments, a snapshot may include source code for the application. When the source code may be included in a snapshot in block 712, the source code in the vicinity of the breakpoint or calling routine may be captured in block 714. When the source code may not be included in block 712, pointers to locations in the source code may be identified in block 716.

Some embodiments unpack various memory objects, which may be defined in various complex structures, an example of which may be hierarchical structure. Such memory objects may be identified in block 718 and processed in block 720.

For each memory object, the first level of data values may be retrieved in block 722. If another level is to be retrieved in block 724, the additional level may be retrieved in block 726. When all of the levels have been retrieved that were requested in block 724, the process may return to block 720 to process another memory object.

In some snapshot definitions, a user may be able to select the amount of data to collect. Part of such a definition may include defining a portion or all of a complex data object to collect. Some data objects may be very large and cause a large amount of data to be collected in a snapshot. When all of such data may not be useful, a subset may be collected.

Metadata may be collected in block 728. The metadata may be various data that may not be retrievable from the call stack and various memory objects. For example, metadata may include timestamps, external events, hardware interrupt states, hardware and software configurations, performance metrics, or other information.

The snapshot data may be formatted in block 730 and encryption may be applied in block 732. The snapshot may be transmitted to storage in block 734 and the snapshot code may end in block 736.

Figure 8:
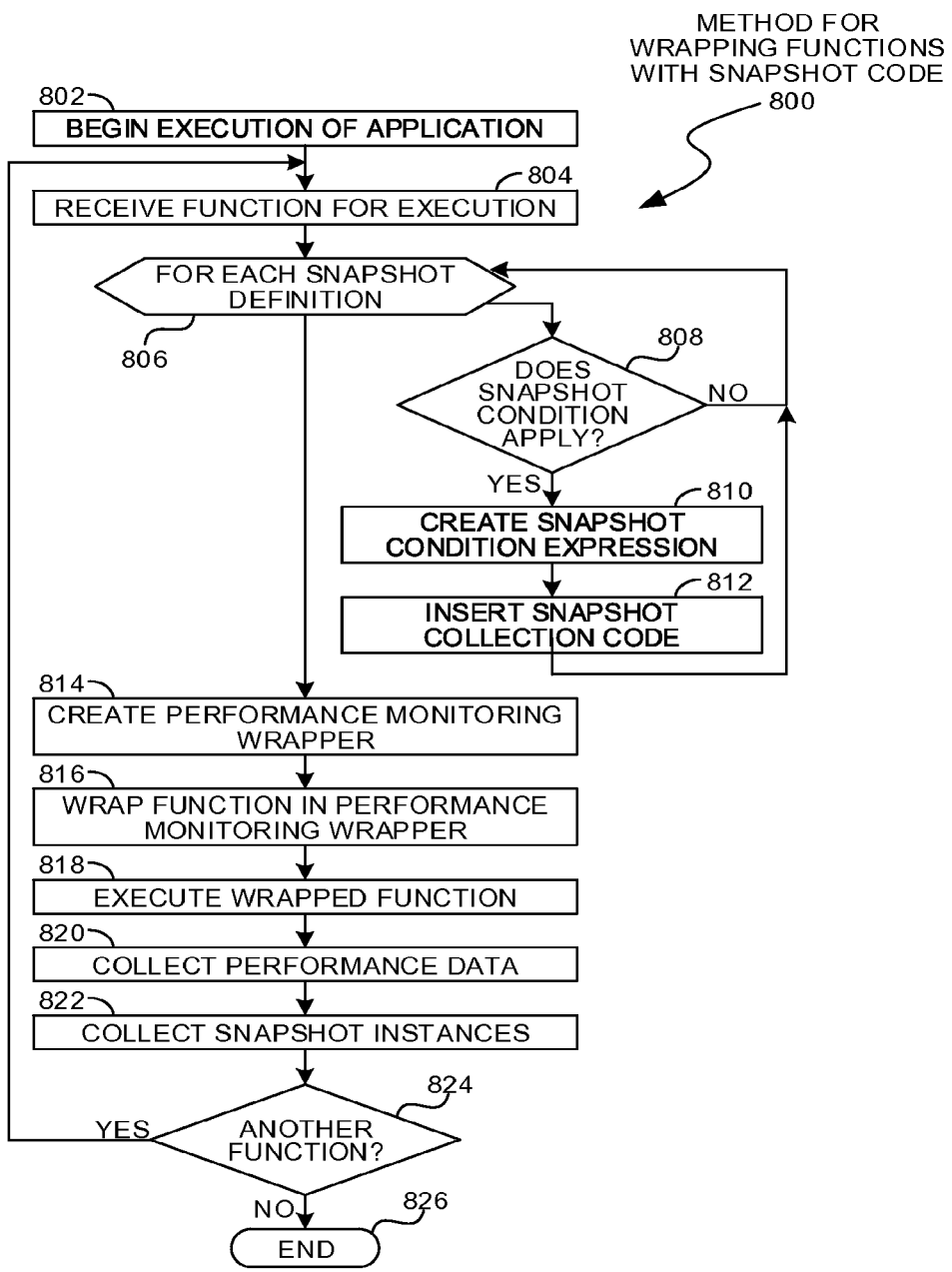
FIG. 8 is a flowchart illustration of an embodiment showing a method for wrapping function with snapshot code.

FIG. 8 is a flowchart illustration of an embodiment 800 showing a method for wrapping functions with snapshot code. Embodiment 800 illustrates one example of a mechanism to deploy snapshot code, and one which may be automated. In some cases, the method of embodiment 800 may be incorporated into a monitoring system that may wrap functions for performance monitoring.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 may illustrate a mechanism that may integrate performance monitoring and snapshot gathering in a single system. The performance monitoring may operate by wrapping all or selected functions with a performance monitoring function that may gather operational data about an application. As each function may be evaluated for monitoring, an additional analysis may determine whether or not the conditions for a snapshot may be met by the function. If so, the system may add snapshot code to the function or the wrapper to collect snapshot data.

An application may begin execution in block 802. The application may have multiple functions that may be executed as part of the application. The functions may be subroutines or other blocks of executable code.

A function may be received in block 804. An analysis may begin in block 806 to evaluate each of the snapshot definitions to the current state of the application. For each snapshot definition, an analysis may determine if a snapshot condition may apply to the function in block 808. If not, the snapshot is skipped and the process may return to block 806. If so, a snapshot condition expression may be created in block 810 and snapshot code may be inserted into the function or wrapper in block 812.

The analysis of block 808 may attempt to identify whether or not any snapshot definition may apply to the function about to be executed. The analysis may be an initial determination that a snapshot may be performed in a function, then additional conditions may be added to the snapshot code, so that the snapshot may be executed only when the full set of conditions may be satisfied.

A performance monitoring wrapper may be created in block 814 and the function to be executed may be wrapped in the performance monitoring wrapper in block 816.

In some cases, the snapshot code may be inserted into the executable code of the function. In other cases, the snapshot code may be inserted into the wrapper. When the snapshot code is part of the wrapper, the snapshot code may be configured to execute prior to executing the function or after the function has completed.

The wrapped function may be executed in block 818 and performance data may be collected in block 820. Snapshot instances may be collected in block 822.

When another function is to be executed in block 824, the process may return to block 804. When all the functions have been executed in block 824, the application may end in block 826.

Figure 9:
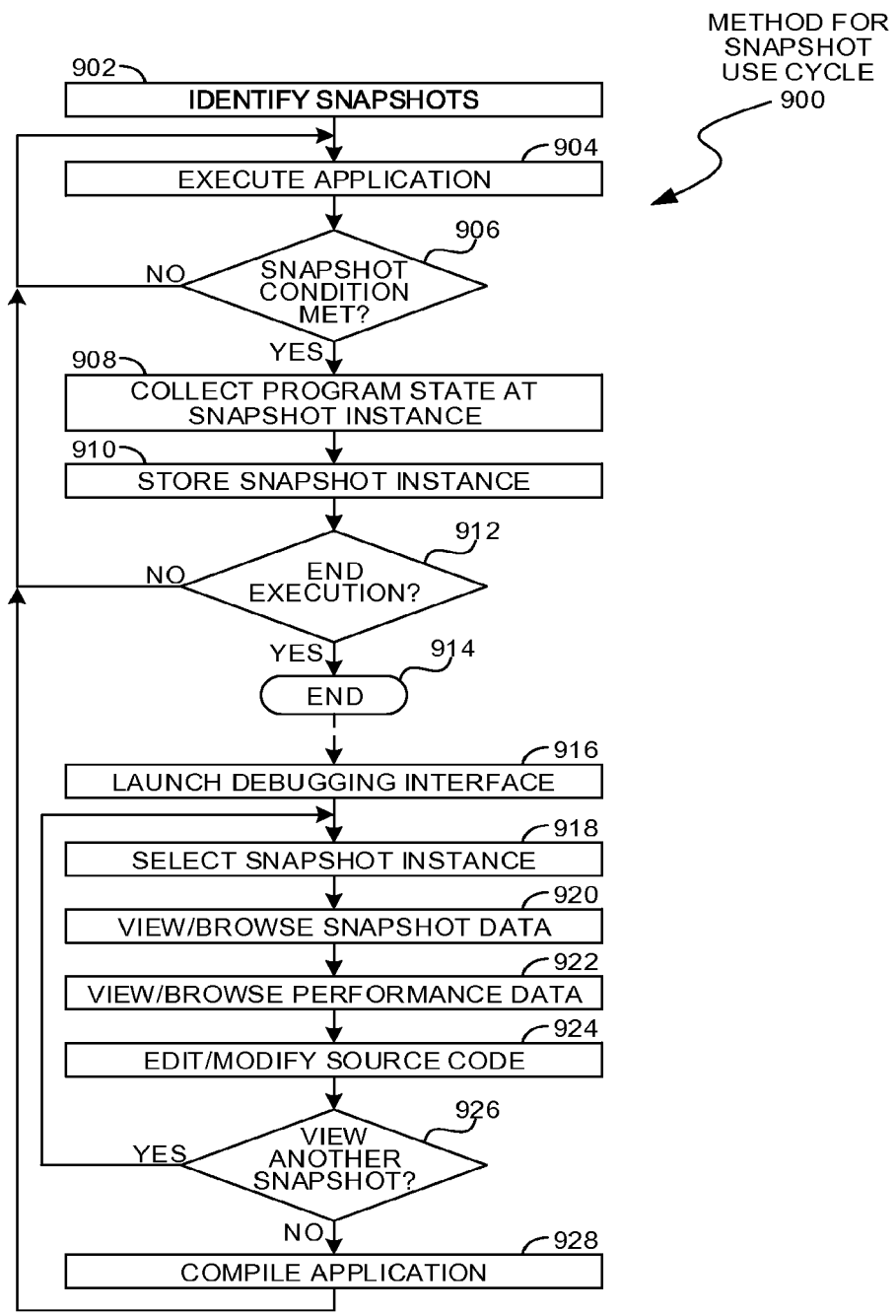
FIG. 9 is a flowchart illustration of an embodiment showing a method for a snapshot use cycle.

FIG. 9 is a flowchart illustration of an embodiment 900 showing a lifecycle of a snapshot. Embodiment 900 shows snapshot collection and snapshot use, and shows various use scenarios for snapshots.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 shows a simplified method for snapshot instance collection and viewing. In one use case for the method, a programmer may create one or more snapshot definitions which may be run against an application. While the application executes, snapshots may be collected. At a later time, the programmer may use a debug viewer to browse each snapshot instance to determine what may have been happening with the application at the time of each snapshot instance.

In block 902, snapshot definitions may be identified. As an application executes in block 904 and a snapshot condition is met in block 906, the program state or a subset of program state may be collected in block 908. The snapshot instance may be stored in block 910. If execution is ongoing in block 912, the process may return to block 904. When execution ends in block 912, the application may end in block 914.

The steps from 902 through 914 may reflect the data gathering phase, where snapshot instances may be collected during application execution. The following steps may reflect the activities that may be performed to view and browse the information contained in the snapshot instance.

A debugging interface may be launched in block 916. One example of such an interface may be found in embodiment 400, although other configurations may also be used.

A snapshot instance may be selected in block 918. The snapshot data may be viewed and browsed in block 920. In embodiments where performance data are also available, performance data may be viewed and browsed in block 922.

The debug interface may include a code viewer and code editor. When an editor is present, the programmer may update or modify the source code using the editor in block 924.

If another snapshot is selected to be viewed in block 926, the process may loop back to block 918. When the user has completed viewing snapshots in block 926 and the user made changes to the application, the application may be compiled in block 928 and the process may loop back to block 904.

Figure 10:
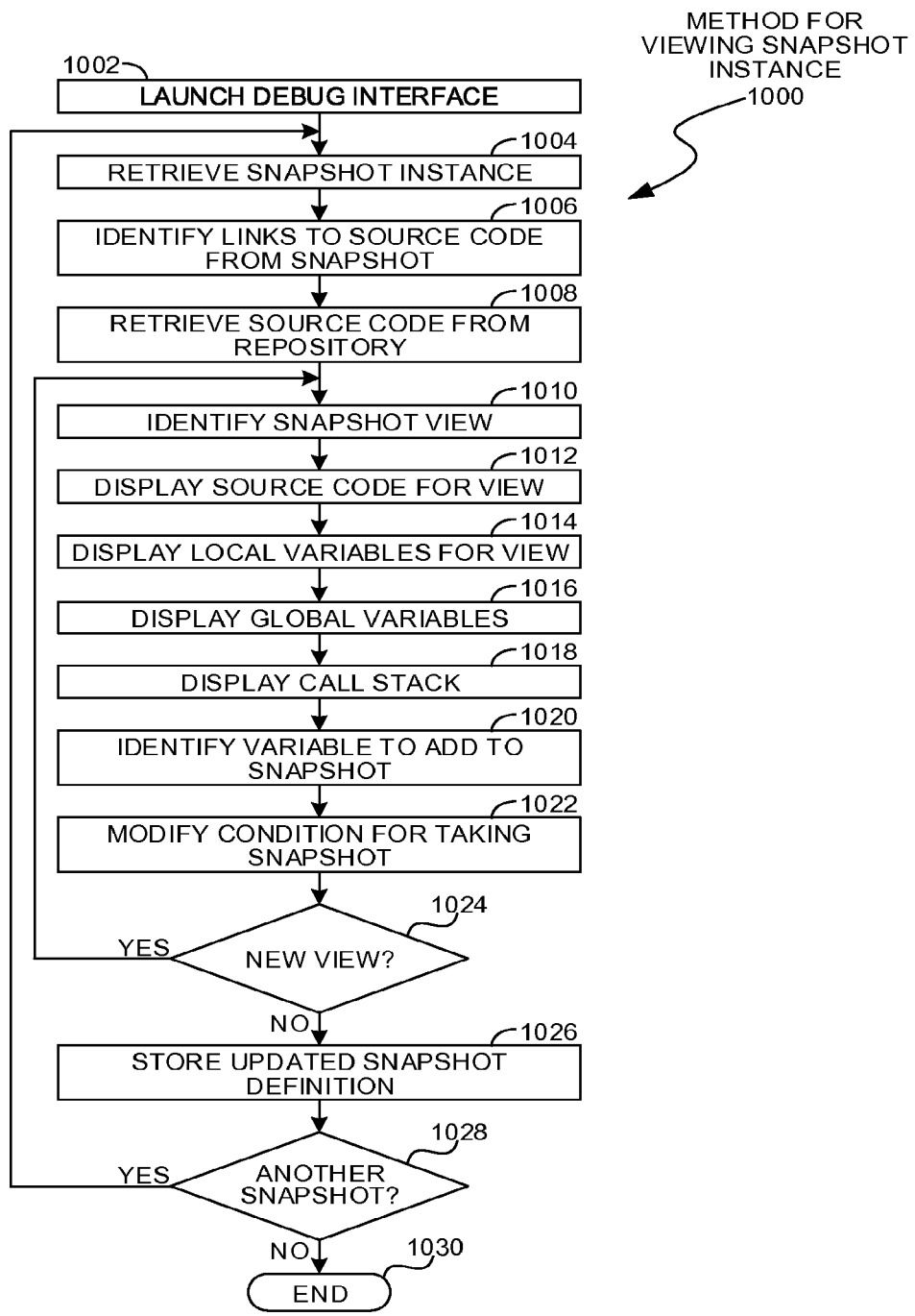
FIG. 10 is a flowchart illustration of an embodiment showing a method for viewing a snapshot instance.

FIG. 10 is a flowchart illustration of an embodiment 1000 showing a method for viewing a snapshot instance. Embodiment 1000 may be a simplified example of some of the operations of a debug interface that may display and interact with a snapshot instance. The example of embodiment 1000 illustrates an example of a debug interface where source code may be retrieved from a repository that may be separate from the snapshot instance. In other embodiments, the Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 is a simplified example of a process that may be performed by a debug interface. The process of embodiment 1000 is quite linear, however many of the interactive features of a debug interface may happen in different sequences or may occur in parallel with other operations.

In block 1002, a debug interface may be launched.

A snapshot instance may be retrieved in block 1004. From the snapshot instance, links or pointers to the source code may be identified in block 1006. The source code may be retrieved from a source code repository in block 1008.

A view of the snapshot may be selected in block 1010. In many cases, the code associated with the deepest level of the call stack may be selected as the first view. The source code associated with the view may be displayed in block 1012. Local variables may be displayed in block 1014 and global variables may be displayed in block 1016. The call stack may be displayed in block 1018. At this point, a user may be able to browse through the data.

The user may identify a variable to add to the snapshot definition in block 1020 and may modify the condition under which the snapshot may be taken in block 1022. The changes in blocks 1020 and 1022 may update the snapshot definition. The updated snapshot definition may be deployed to cause future snapshot instances to be collected.

If another view of the snapshot were desired in block 1024, the process may return to block 1010. Another view of the snapshot may be requested when a user selects another frame on a call stack, for example.

After the views may be analyzed in block 1024, the updated snapshot definition may be stored in block 1026. When additional snapshots may be viewed in block 1028, the process may return to block 1004, otherwise the process may end in block 1030.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   at least one processor; and
   a debug viewer executing on the at least one processor, wherein the debug viewer:
   retrieves a snapshot taken during execution of an application and containing local variable values and call stack data;
   retrieves a performance metric obtained during execution of the application;
   displays an interactive time line in a debug user interface, the interactive time line comprising both a first performance indicator derived from the performance metric and at least the snapshot, wherein the first performance indicator and the snapshot are rendered as interactive elements on an interactive timeline, such that a user is enabled to select the performance indicator of the snapshot to trigger a display of underlying data associated with the first performance indicator of the snapshot, when a corresponding interactive element is selected from the interactive timeline;
   displays a field for receiving user input that is operable to define one or more conditions for a subsequent snapshot to be taken during execution of the application;
   displays a field for receiving additional user input that is operable to define one or more snapshot definitions for data to be collected during the subsequent snapshot;
   receives the user input for the one or more conditions and the additional user input for the one or more snapshot definitions;
   prior to a subsequent execution of the application, automatically inserts a new snapshot source code into the application, wherein the new snapshot source code may be inserted by automatically traversing the application source code to identify the one or more conditions for a subsequent snapshot to be taken;
   monitors the application for the one or more conditions during the subsequent execution of the application; and
   detects, upon the subsequent execution of the application, that the one or more conditions has been satisfied, triggers the subsequent snapshot to collect data based on the one or more snapshot definitions.

2. The system of claim 1, the snapshot comprising at least a portion of source code for the application, the portion of source code allows the user to interactively select a variable within the source code display and perform an action comprising view a current value of the selected variable, define a breakpoint, and delete a breakpoint.

3. The system of claim 1, the snapshot comprising at least a pointer to a location in source code.

4. The system of claim 3, the system further comprising:
   a source code library comprising a first version of the source code being executed as the application when the first instance of the snapshot is taken;
   the snapshot comprising a reference to the first version of the source code.

5. The system of claim 1, wherein:
   variable values in snapshots are encrypted or obfuscated, wherein the debug viewer performs processes for decrypting or de-obfuscating the variable values; and
   wherein the debug viewer displays performance metrics comprising function names that are not encrypted or obfuscated.

6. The system of claim 5, the debug user interface further comprising:
   a snapshot mechanism by which the user may select the first instance of the snapshot.

7. The system of claim 1, the debug user interface further comprising:
   controls comprising a pause mechanism, the pause mechanism causing the application to pause executing.

8. The system of claim 7, the debug user interface further comprising:

a browser that displays a plurality of local variables while the application has paused executing; and a user control that selects a local variable to be collected during a future snapshot.

9. The system of claim 1, the one or more conditions comprising a predefined value for an additional local variable.

10. The system of claim 1, the one or more conditions comprising a predefined value for a global variable.

11. The system of claim 1, the one or more conditions comprising a predefined event.

12. A computer implemented method that is implemented by a debug viewer, the method comprising:

retrieving a snapshot taken during execution of an application and containing local variable values and call stack data;

retrieving a performance metric obtained during execution of the application;

displaying an interactive time line in a debug user interface, the interactive time line comprising both a first performance indicator derived from the performance metric and at least the snapshot, wherein the first performance indicator and the snapshot are rendered as interactive elements on an interactive timeline, such that a user is enabled to select the performance indicator of the snapshot to trigger a display of underlying data associated with the first performance indicator of the snapshot, when a corresponding interactive element is selected from the interactive timeline;

displaying a field for receiving user input that is operable to define one or more conditions for a subsequent snapshot to be taken during execution of the application;

displaying a field for receiving additional user input that is operable to define one or more snapshot definitions for data to be collected during the subsequent snapshot;

receiving the user input for the one or more conditions and the additional user input for the one or more snapshot definition;

prior to a subsequent execution of the application, automatically inserting a new snapshot source code into the application, wherein the new snapshot source code may be inserted by automatically traversing the application source code to identify the one or more conditions for a subsequent snapshot to be taken;

monitoring the application for the one or more conditions during the subsequent execution of the application; and detecting, upon the subsequent execution of the application, that the one or more conditions has been satisfied, triggering the subsequent snapshot to collect data based on the one or more snapshot definitions.

13. The method of claim 12, the snapshot comprising at least a portion of source code for the application, which portion of source code allows the user to interactively select a variable within the source code display and perform an action comprising viewing a current value of the selected variable, define a breakpoint, and delete a breakpoint.

14. The method of claim 12, the snapshot comprising at least a pointer to a location in source code.

15. The method of claim 14, the system further comprising:

a source code library comprising a first version of the source code being executed as the application when the first instance of the snapshot is taken;

the snapshot comprising a reference to the first version of the source code.

16. The method of claim 12, wherein:

variable values in snapshots are encrypted or obfuscated, wherein the debug viewer performs processes for decrypting or de-obfuscating the variable values; and wherein the debug viewer displays performance metrics comprising function names that are not encrypted or obfuscated.

17. The method of claim 16, the debug user interface further comprising:

a snapshot mechanism by which the user may select the first instance of the snapshot.

18. The method of claim 12, the debug user interface further comprising:

controls comprising a pause mechanism, the pause mechanism causing the application to pause executing.

19. A computer program product comprising one or more computer-readable hardware storage devices having thereon one or more computer-executable instructions that are structured such that, when executed by one or more processors of a computing system, cause the computing system to perform a method for conditionally inserting custom code within an application, the method comprising:

retrieving a snapshot taken during execution of an application and containing local variable values and call stack data;

retrieving a performance metric obtained during execution of the application;

displaying an interactive time line in a debug user interface, the interactive time line comprising both a first performance indicator derived from the performance metric and at least the snapshot, wherein the first performance indicator and the snapshot are rendered as interactive elements on an interactive timeline, such that a user is enabled to select the performance indicator of the snapshot to trigger a display of underlying data associated with the first performance indicator of the snapshot, when a corresponding interactive element is selected from the interactive timeline;

displaying a field for receiving user input that is operable to define one or more conditions for a subsequent snapshot to be taken during execution of the application;

displaying a field for receiving additional user input that is operable to define one or more snapshot definitions for data to be collected during the subsequent snapshot;

receiving the user input for the one or more conditions and the additional user input for the one or more snapshot definitions;

prior to a subsequent execution of the application, automatically inserting a new source snapshot code into the application, wherein the new snapshot source code may be inserted by automatically traversing the application source code to identify the one or more conditions for a subsequent snapshot to be taken;

monitoring the application for the one or more conditions during the subsequent execution of the application; and detecting, upon the subsequent execution of the application, that the one or more conditions has been satisfied, triggering the subsequent snapshot to collect data based on the one or more snapshot definitions.

* * * * *